US008819803B1

(12) United States Patent
Richards et al.

(10) Patent No.: US 8,819,803 B1
(45) Date of Patent: Aug. 26, 2014

(54) VALIDATING ASSOCIATION OF CLIENT DEVICES WITH AUTHENTICATED CLIENTS

(75) Inventors: Gareth D. Richards, Woodstock (GB); Yedidya Dotan, Newton, MA (US); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 53 days.

(21) Appl. No.: 13/537,594

(22) Filed: Jun. 29, 2012

(51) Int. Cl.
*H04L 9/08* (2006.01)

(52) U.S. Cl.
USPC ........ 726/9; 726/5; 726/6; 713/156; 713/186; 709/224; 380/258

(58) Field of Classification Search
CPC ........ H04L 9/321
USPC ........ 726/5, 7, 9
See application file for complete search history.

(56) References Cited

U.S. PATENT DOCUMENTS 7,428,641 B2 * 9/2008 Allen ........ 713/182
2006/0041507 A1 * 2/2006 Novack et al. ........ 705/50
2006/0282660 A1 * 12/2006 Varghese et al. ........ 713/155
2007/0112578 A1 * 5/2007 Randle et al. ........ 705/1
2007/0289004 A1 * 12/2007 Chao et al. ........ 726/9
2008/0046984 A1 * 2/2008 Bohmer et al. ........ 726/5
2009/0254975 A1 * 10/2009 Turnbull et al. ........ 726/3
2011/0047608 A1 * 2/2011 Levenberg ........ 726/7
2011/0225625 A1 * 9/2011 Wolfson et al. ........ 726/1
2012/0005729 A1 * 1/2012 Amitai et al. ........ 726/4
2012/0023567 A1 * 1/2012 Hammad ........ 726/9
2012/0054491 A1 * 3/2012 Tippett ........ 713/168
2012/0117250 A1 * 5/2012 Santamaria et al. ........ 709/227
2012/0144457 A1 * 6/2012 Counterman ........ 726/5
2012/0174223 A1 * 7/2012 Eisen ........ 726/23
2012/0180124 A1 * 7/2012 Dallas et al. ........ 726/22
2012/0240211 A1 * 9/2012 Counterman ........ 726/9
2012/0253978 A1 * 10/2012 Bishop et al. ........ 705/26.41

* cited by examiner

*Primary Examiner* — Morshed Mehedi
(74) *Attorney, Agent, or Firm* — Krishnendu Gupta; Deepika Bhayana

(57) ABSTRACT

A method is used in validating association of client devices with authenticated clients. An authentication request for authenticating a client is received from a client device used by a client for establishing a session with a server. The client is authenticated by an authentication device. A token is created and provided to the client device. Identification information of the client device is gathered. The identification information identifies the client device. The identification information gathered from the client device is evaluated. Based on the evaluation, it is validated that the identification information corresponds to a client device associated with the authenticated client.

20 Claims, 2 Drawing Sheets

VALIDATING ASSOCIATION OF CLIENT DEVICES WITH AUTHENTICATED CLIENTS

BACKGROUND

1. Technical Field

This application relates to validating association of client devices with authenticated clients.

2. Description of Related Art

Computer networks, and in particular Wide Area Networks (WANs) such as the Internet, provide opportunities for the misuse and abuse of communications traveling over the network. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

Uses for the Internet and the World Wide Web are continually increasing, and have expanded into "secure" areas. Further, as the size and diversity of the Internet grows, so do the devices and applications that use the network. Originally, network applications such as web browsers, terminal clients, and e-mail readers were the only programs accessing the Internet. Now, almost every new device or application has a networking component, whether it is to obtain content, updates, manage licensing, or report usage statistics.

Existing computer systems typically employ a variety of security-related functions for protection against potentially harmful user activity. For example, user authentication is often employed which requires a user to provide a password or other credentials which establishes the user's identity and protects against the possibility of an intruder or fraudster masquerading as an authorized user and engaging in harmful activity. Another type of function, referred to as access control, enforces limitations on the activities that authorized users can engage in. In one common example, access controls may be placed on certain storage devices or file system directories so that only certain users are permitted to access the data therein. Such access controls can serve to protect sensitive data from being accidentally deleted or used for an improper purpose by a user who has no legitimate need for access to the data.

However, it will be appreciated that existing security functions may not always provide adequate protection against certain types of harmful activity. For example, the password of a user may be compromised enabling an intruder or fraudster to engage in harmful activities.

It will also be known by those skilled in the art that so-called phising or phishing attacks are also a substantial threat. A phishing attack usually involves an attacker or fraudster fooling the user to exchange secret data such as the log-on details. The attacker, a man-in-the-middle, uses the transmitted authentication data thereafter or simultaneously to affect a log-on procedure under the identity of the attacked authorized user and misuse the user's rights.

SUMMARY OF THE INVENTION

A method is used in validating association of client devices with authenticated clients. An authentication request for authenticating a client is received from a client device used by a client for establishing a session with a server. The client is authenticated by an authentication device. A token is created and provided to the client device. Identification information of the client device is gathered. The identification information identifies the client device. The identification information gathered from the client device is evaluated. Based on the evaluation, it is validated that the identification information corresponds to a client device associated with the authenticated client.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
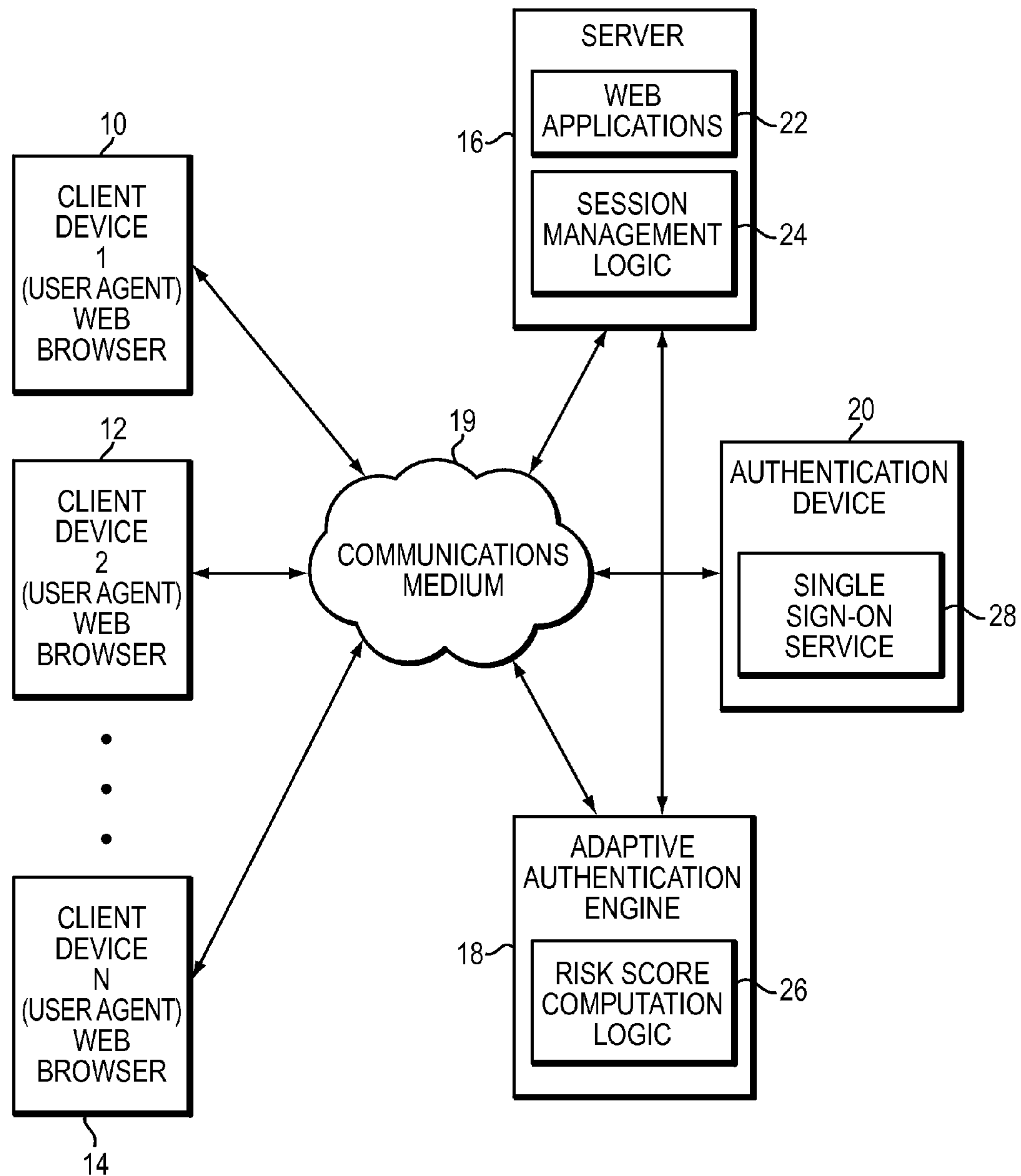
FIG. 1 is an example of an embodiment of a computer system that may utilize the techniques described herein.

Described below is a technique for use in validating association of client devices with authenticated clients, which technique may be used to provide, among other things, receiving an authentication request for authenticating a client by establishing a session with a server, authenticating the client, by an authentication device, by creating a token and providing the token to a client device, gathering identification information of the client device, where the identification information identifies the client device, evaluating the identification information gathered from the client device, and based on the evaluation, validating that the identification information corresponds to a client device associated with the authenticated client.

Security Assertion Markup Language ("SAML") is an XML-based open standard specifications for exchanging authentication and authorization data between a set of systems such that the set of systems may include a client, an authentication device and a server. SAML defines XML-based assertions, protocols, bindings, and profiles. A SAML system may use SAML protocols, or other protocols, to send a SAML assertion (also referred to herein as "bearer token", "bearer assertion" or simply as "token") from one system to another system. A SAML protocol is a request-response protocol that describes how a SAML object such as an SAML assertion is packaged within SAML request and response objects, and provides processing rules that SAML systems must follow when creating or receiving a SAML object.

Typically, a SAML assertion includes security information such as information regarding a client or device for which the SAML assertion has been created, an assertion identifier, and authentication information. SAML assertions are generally transferred from an authentication device to a server. A SAML assertion includes information that a server may use to make access-control decisions. Thus, a server may use an assertion as an input to a policy evaluation logic for determining whether to grant access to a resource. Generally, a SAML system assumes that a user is associated with an authentication device such that the authentication device is expected to provide authentication services to the user. Further, a server relies on an authentication device to identify a user. An authentication device provides an authentication token such as a SAML assertion to a server. On the basis of this authentication token such as SAML assertion, the server makes an access control decision. Thus, an authentication device such as an identity provider system issues an assertion (also referred to herein as "authentication token") such as a SAML assertion for a user indicating that the user is associated with specific attributes and has been authenticated by the authentication device.

Generally, a server such as a service provider system using a communication protocol such as SAML must authenticate a user first before providing access to a resource of the server. The authentication of a user is performed by an authentication device such as an identity provider system by redirecting a web browser of the user to the authentication device. Following authentication of a user by an authentication device, the authentication device provides an authentication token (also referred to herein as "a bearer token") such as a SAML assertion to the user and redirects the user to a server such that the server uses the authentication token for authenticating the user and providing access to the user.

Conventionally, when a server receives a bearer token such as a SAML assertion generated by an authentication device such as an identity provider system, the server is unable to verify that a user providing the bearer token to the server is same as the user that has been authenticated by the authentication device. Thus, in such a conventional system, it is difficult or impossible for a server to verify that a user providing a token is associated with the token. Thus, in such a conventional system, a bearer token does not include any information proving that an entity presenting the bearer token is the entity for which the bearer token has been created. Thus, in such a conventional system, a bearer token is simply accepted by a server under an assumption that a user providing the bearer token is same as the user that has been authenticated by an authentication device and the bearer token has been created for the user.

Thus, in such a conventional system, an example sequence of a series of communications between a user, a server and an authentication device using a conventional technique is described below. In such a conventional system, when a user attempts to access a web application of a server, the server first determines whether the user has been authenticated. In such a conventional system, if the user has not been authenticated, an authentication request is created and sent to an authentication device via a web browser of the user. In such a conventional system, upon receiving the authentication request, the authentication device authenticates the user using any one of the known authentication techniques. Further, in such a conventional system, the authentication device creates a bearer token such as a SAML assertion indicating successful authentication of the user and provides the bearer token to the web application via the web browser of the user. Further, in such a conventional system, a local session is created based on the bearer token received from the user. Thus, in such a conventional system, the server simply accepts a bearer token without further confirming authenticity of the user providing the bearer token, establishes an authenticated session with the user and provides access to the user. Thus, in such a conventional system, an attacker may obtain a bearer token from a user that has been authenticated by an authentication device and provides that token to a server by impersonating as the authenticated user. As a result, in such a conventional system, an attacker is authenticated successfully by the server and is able to access resources of the server because the server simply accepts the token provided by the attacker assuming that the attacker is same as the user that has been authenticated by an authentication device. Thus, in such a conventional system, a bearer token is not associated with client devices associated with an authenticated client.

By contrast, in at least some implementations in accordance with the current technique as described herein, associating a token with a device by using information identifying the device enables a server receiving the token to validate that a user providing the token is same as the user for which the token has been created and not an attacker fraudulently posing as the user. In at least one embodiment of the current technique, a server authenticates a client upon receiving an authentication request by using an authentication device that creates a authentication token and provides the authentication token to a client device used by the client. Further, when a client device submits the authentication token to a server, the server obtains identifying information (e.g., device fingerprint information) from the client device that is providing the authentication token and evaluates the identifying information obtained from the client device for validating that the identifying information corresponds to a client device associated with the authenticated client. In at least one embodiment of the current technique, a device detection and authentication system such as an adaptive authentication system may evaluate identifying information of a client device and information (e.g., information of an authenticated user) from a bearer token for validating the association between the client device and an authenticated client for which the bearer token has been created. One mechanism that may be used by an adaptive authentication system for evaluating information includes determining a risk score. Further, a risk score may also be based on behavior patterns of a user and devices used by the user. In at least one embodiment of the current technique, if a risk score computed by a server is higher than a specific threshold value, the risk score may indicate that there is a higher probability that a user providing a token is not same as the user for which the token has been created. Thus, in such a case, the server may either reject the token or perform additional authentication for further authenticating the user. However, if a risk score computed by a server is lower than a specific threshold value, the risk score may indicate that there is a higher probability that a user providing a token is same as the user for which the token has been created. Thus, in such a case, the server accepts the token. It should be noted that a device detection and authentication system such as an adaptive authentication system may use any one of the know techniques for validating association of a client device with an authenticated client.

In at least some implementations in accordance with the technique as described herein, use of validating association of client devices with authenticated clients can provide one or more of the following advantages: detecting a security risk by validating a device of a client when the client sends a token to a server for establishing a session between the device and the server, and preventing an attack by associating information identifying a device of a client with a token that is used for communicating with a server.

Referring now to FIG. 1, shown is an example of an embodiment of a computer system that may be used in connection with performing the technique or techniques described herein. FIG. 1 illustrates a data system which utilizes adaptive authentication to establish a trusted session between a client application and an application server. A data system may include one or more user agents 10, 12, 14, server 16, adaptive authentication system 18, authentication device 20, and communication medium 19. A user agent may be a browser application executing on a client device which may access data protected by a server by establishing a session with the server which is followed by authentication of the user agent. Client devices may include any of a variety of devices, such as cell phones, smart phones, laptops, netbooks, tablets, tablet PCs, iPADs, and personal digital assistants (PDAs), among others.

Further, a user agent may execute on a portable device, such as a mobile telephone, personal digital assistant (PDA), wireless email device, game console. A user agent may alternatively execute on a desktop or laptop personal computer (PC), a microcomputer, a workstation, a mainframe computer, a wired telephone, a television set top box, or any other information processing device which can benefit from the use of single sign-on techniques in accordance with the invention.

Further, a user agent may also be referred to herein as simply a "user." The term "user" should be understood to encompass, by way of example and without limitation, a client device, a person utilizing or otherwise associated with the client device, or a combination of both. An operation described herein as being performed by a user agent may therefore, for example, be performed by a client device, a person utilizing or otherwise associated with the client device, or by a combination of both the person and the client device. Similarly, a password or other authentication information described as being associated with a user agent may, for example, be associated with a client device, a person utilizing or otherwise associated with the client device, or a combination of both the person and the device.

Each client device (e.g., 10, 12, 14) may include an installed web browser application and an installed client application. For example, a client device may be a general purpose computer having an installed web browser application and an installed client application. Similarly, a client device may be an electronic tablet device having an installed web browser application and an installed client application. Likewise, a client device may be a smart phone having an installed web browser application and an installed client application, and so on. It should be understood that a client devices can be thought of as multi environment devices since they are capable of joining multiple electronic environments (e.g., a VDI environment, a VPN, etc.) even though installed client applications may not be web clients.

A server 16 may be, for example, a remote application server such as a web site or other software program that is accessed by a user agent over a network 19 using any one of the known communication protocol. A network 19 (also referred to herein as "communication medium"), may comprise, for example, a global computer network such as the Internet, a wide area network (WAN), a local area network (LAN), a satellite network, a telephone or cable network, or various portions or combinations of these and other types of networks. A user of a client device may hold a token device. A client device (e.g., 10, 12, 14) (also referred to herein as "user agent") connects to a server 16 such as a web server by way of a network connection 19. A network connection may be a direct connection between a client device (e.g., 10, 12, 14) and a web server 16 or it may be an indirect connection across a computer network (not depicted) in accordance with well-understood principles. It should be understood that a browser may refer to a web browser or to any other type of program used to render and display markup files in a form suitable for viewing.

It should be noted that a network environment described above herein may be a cloud computing system, and user agents 10, 12, 14 and servers (e.g., web servers 16, 18, 20) may be part of a cloud computer system. Cloud computing is well understood in the art, and generally includes provisioning dynamically scalable and often virtualized resources as a service over the internet. Thus, in a cloud computing system, server may be a virtual server and actually reside over multiple physical servers. Similarly, in a cloud computing system, there may be multiple servers, and the multiple server may be virtual servers residing in a single physical server, or in multiple physical servers.

In at least one embodiment of the current technique, a verifier may be used to help securely authenticate the identity of a user agent. As used here, "authenticate" means to verify the identity of a user or a user agent or a client device executing a user agent, and so "authenticate" and "verify" can be used interchangeably throughout. Also, although the specification will discuss, for simplicity, authentication of "users," it should be understood that "users" means any entity requiring authentication such as, for example, a person, animal, device, machine, or computer. A verifier can be any sort of device such as adaptive authentication system 18 that implements the techniques described herein. Authentication can result in the performance of one or more actions including, without limitation, providing access or privileges, taking action, or enabling some combination of the two. Access includes, without limitation: access to a physical location, communications network, or a computer system; access to such services as financial services and records, or health services and records; or access to levels of information or services. It may be important to determine whether a device that is requesting to access data of a web server by attempting to establish a session between the device and the web server by providing a bearer token is same as the device that has been authenticated by an identity provider and for which the bearer token has been created.

It should be understood that in some embodiments (not depicted), a server 16, adaptive authentication system 18, and authentication device 20 may all run on the same machine or separate machines which are connected over a network. In at least one embodiment of the current technique, authentication device 20 communicates with a user agent (e.g., 10, 12, 14) for establishing the identity of the user agent. This may include querying the user for a username and password, receiving the username and password from the user, verifying that the username and password match (i.e., that the user has entered the correct password for the username account), and matching the username with a corresponding specific access policy. Further, adaptive authentication system 18 and authentication device 20 may use any one of the well-established techniques for ascertaining the identity of a user.

It should be noted that an authentication device 20 may be any one of the known authentication systems such as an identity provider system that authenticates a user using any one of the know authentication techniques, creates an authentication token for the user and provides the authentication token to a client device of the user.

It should be noted that, a users and/or a client is authenticated such that the user and/or a client sends an authentication request to a server using a client device. Thus, an authentication token is created for a user and/or a client and is provided to a client device used by the user and/or client.

The adaptive authentication server 18 performs routine operations to determine whether to flag possible fraudster situations so that remedial steps can be taken. In this situation, the authentication server 18 compares user behavior data to recent user behavior data to generate a user behavior risk score which is evaluated against a predefined user behavior threshold (e.g., a tunable number between 0 and 1000). If the user behavior risk score is lower than the user behavior threshold, it may indicate that a possible fraudster situation is unlikely. However, if the user behavior risk score is higher than the user behavior threshold, it may indicate that a possible fraudster situation is likely. The adaptive authentication server 18 is constructed and arranged to perform authentication operations In some arrangements, the authentication operations are exclusively risk-based.

It should be understood that an adaptive authentication engine 18 may be any one of the known device detection authentication system that manages association of client devices with a client and/or user and evaluates information gathered from a client device for validating the association of the client device with an authenticated client. It should be understood that the above-described adaptive authentication server 18 is capable of utilizing RSA® Adaptive Authentication which is offered by EMC Corporation of Hopkinton, Mass. Certain aspects of RSA® Adaptive Authentication relate to risk-based authentication (RBA) and fraud detection which involve measuring over one hundred risk indicators to identify high-risk and suspicious activities. Certain aspects of RSA® Adaptive Authentication are powered by risk-based authentication technology that conducts a risk assessment of all users behind the scenes. A unique risk score is assigned to each activity, and users are only challenged when an activity is identified as high-risk and/or an organizational policy is violated. This transparent authentication enables organizations to increase security without compromising user convenience. Certain aspects of Adaptive Authentication monitor and authenticate activities based on risk, profiles, and policies by correlating: unique browser identification profiles, matching behavioral patterning profiles and inputs from fraud intelligence teams that locate compromised IP addresses and accounts.

Further, adaptive authentication system 18 is described in U.S. patent application Ser. No. 12/751,057 for "Techniques For Authenticating Users Of Massive Multiplayer Online Role Playing Games Using Adaptive Authentication" filed Mar. 31, 2010, which is incorporated in entirety herein by reference. Further, risk score computation logic 26 of adaptive authentication system 18 is described in U.S. patent application Ser. No. 13/432,586 for "Performing Authentication Operations" filed Mar. 28, 2012, which is incorporated in entirety herein by reference. Further, risk score computation logic 26 of adaptive authentication system 18 is also described in U.S. patent application Ser. No. 13/336,570 for "Establishing A Trusted Session From A Non-Web Client Using Adaptive Authentication" filed Dec. 23, 2011, which is incorporated in entirety herein by reference.

To join an electronic environment, a user of a client device (e.g., 10, 12, 14) opens a web browser (i.e., specialized web browsing circuitry formed by running a web browser application on a client device) and conducts an exchange with server 16. During this exchange, the adaptive authentication system 18 performs an adaptive authentication operation based on adaptive authentication factors received from the web browser. Such adaptive authentication factors may include a distinctive client device identifier, browser cookie data, user habits and a geographical location associated with a client device (e.g., 10, 12, 14), and so on.

In connection with adaptive authentication, the adaptive authentication server 18 includes a risk score computation logic 26. The risk score computation logic 26 is constructed and arranged to perform adaptive authentication operations on adaptive authentication factors from client devices (e.g., 10, 12, 14) in order to generate risk scores. For example, from the adaptive authentication factors, the risk score computation logic 26 is able to assess whether the user is authentic (or an imposter) by comparing information such as current browser capabilities, and user habits to previously stored data. A risk score resulting from each adaptive authentication operation is a numerical value which quantitatively identifies a level of risk, and which can be compared to a tunable threshold to determine whether that adaptive authentication operation is successful or unsuccessful. In at least some embodiments, the risk score computation logic 26 includes fuzzy logic circuitry which applies fuzzy logic analysis when evaluating adaptive authentication factors collected from the client devices 10, 12, 14.

It should be understood that a variety of data elements are suitable for use as a bearer token. Examples include temporary certificates, Public Key Infrastructure (PKI) artifacts, SAML tokens, other derived keys and cryptographic data types, combinations thereof, and so on.

Figure 2:
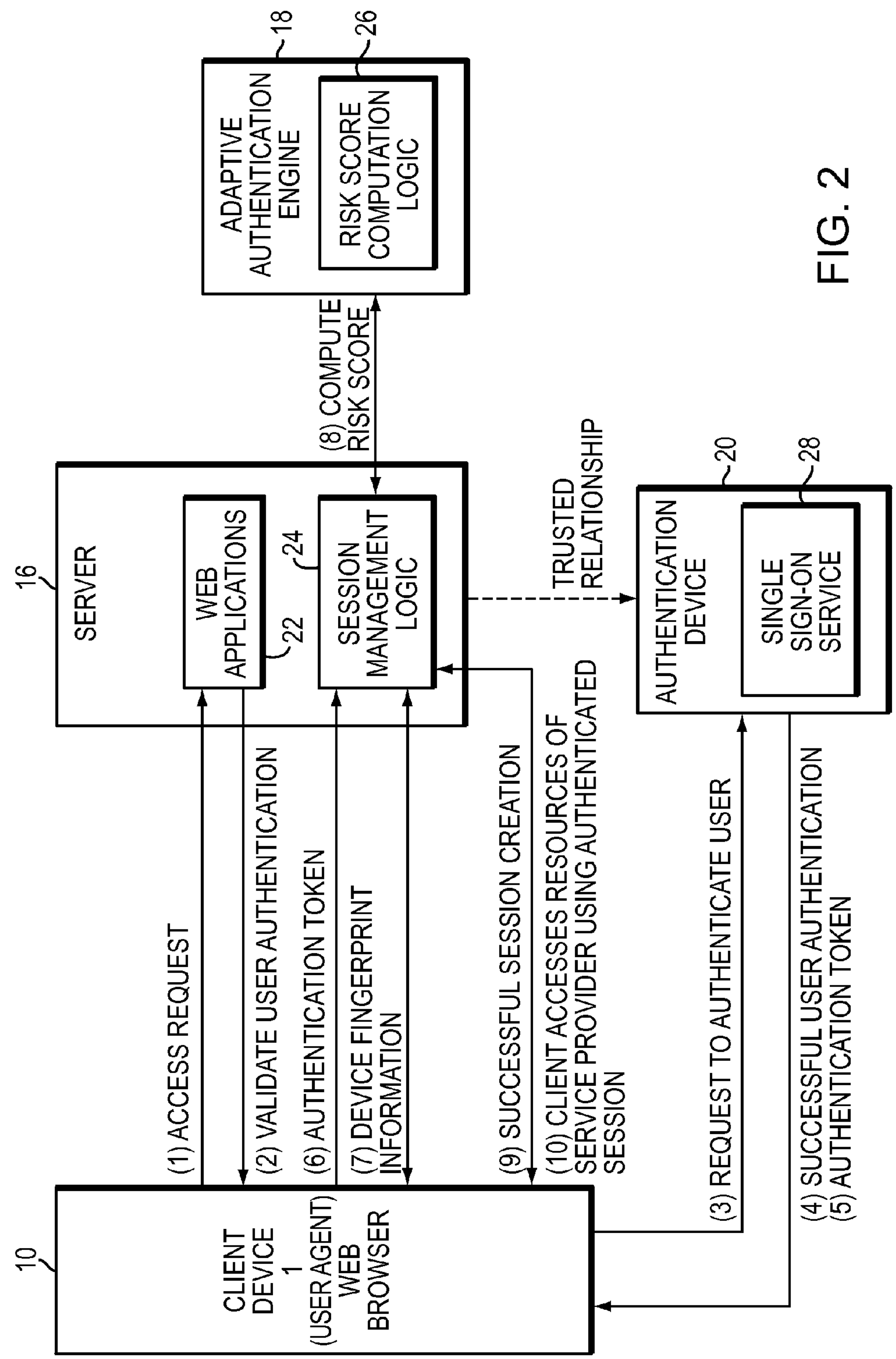
FIG. 2 is a block diagram illustrating in more detail components that may be used in connection with techniques described herein.

Referring to FIG. 2, shown is a more detailed representation of components that may be included in an embodiment using the techniques described herein. FIG. 2 illustrates an example sequence of steps illustrating various communications among the components of an electronic system when establishing a trusted relationship between a client device 10 and a server 16. In such an example, it is assumed that a web browser application and a client application are already properly installed on the client device 10.

In at least one embodiment of the current technique, a server may be a service provider system. Further, in order to access a web page, a user may need to be authenticated first such that authentication of the user may be performed by an authentication device such as a SAML identity provider system by redirecting a web browser of the user to the authentication device. Following authentication of a user, an authentication device may redirect the user to a web page of a server with a bearer token such as a SAML assertion which is accepted by the server as a proof that the user has been authenticated.

In at least one embodiment of the current technique, a server authenticates a client requesting to access resources of the server by validating authenticity of a client device presenting a bearer token such as a SAML assertion to the server. A server validates authenticity of a client by using an adaptive authentication system that uses identifying information such as a device finger print and computes a risk score based on information such as the identifying information (e.g., device fingerprint) and a bearer token such as a SAML assertion. Thus, in at least one embodiment of the current technique, when a portal web page of a server receives an authentication token (e.g., a SAML assertion), the server obtains device fingerprint information from a client device sending the authentication token and provides the device fingerprint information and information from the authentication token to an adaptive authentication system for evaluation such that evaluation may include calculating a risk score. Further, a risk score may also be based on behavior patterns of a client and devices used by the client. If a risk score for a user is higher than a specific threshold, there is a high probability that the client device providing the authentication token is not associated with the authenticated user for which the authentication token has been generated and in such a case, a portal web page may either reject the authentication token or challenge the user to perform additional authentication.

Further details of how a user operates a client device 10 to join an electronic environment provided by the server 16 is described below herein. Initially, the user opens a web browser of the client device 10 (i.e., a specialized circuit formed by a processor of the client device 10 running a web browser application) and attempts to access a web application 22 of a server 16. The web application 22 of the server 16 first determines whether the user 10 has been authenticated. Upon determination that the user 10 has not been authenticated, the web application 22 creates an authentication request such as a SAML request and sends the authentication request to the authentication device 20 via the web browser of the user 10. Upon receiving the authentication request, authentication device 20 authenticates the user 10 and then creates an authentication token such as a SAML assertion that attest to authentication of the user 10. After authentication, the authentication token such as the SAML assertion is provided to the web application 22 via the web browser of the user 10. Thus, after being authenticated by authentication device 20, the user 10 provides the authentication token to the server 16 and attempts to establish a session for accessing resources of server 16 by working in conjunction with session management logic 24.

In at least one embodiment of the current technique, upon receiving an authentication token such as a SAML token, session management logic 24 of server 16 attempts to verify that the web browser providing the authentication token is associated with the client 10 for which the authentication token has been created by authentication device 20. In order to authenticate that the user 10 providing the authentication token is the same as the user that has been authenticated by authentication device 20, web application 22 sends an authentication web page to the web browser of user 10 such that in response to receipt of the authentication web page, the web browser collects authentication data such as identifying information (e.g., a device fingerprint) of a device used by the user 10. Further, the web browser may also collect a set of adaptive authentication factors such as user habits, behavior patters, and geographical location information associated with the client device 10.

Next, the session management logic 24 provides the collected authentication data including the set of adaptive authentication factors to the adaptive authentication server 18. Accordingly, the risk score computation logic 26 of the adaptive authentication system 18 has the set of adaptive authentication factors available as input to an adaptive authentication operation. The risk score computation logic 26 analyzes the adaptive authentication factors and information from the authentication token such as the SAML assertion provided by the user 10 and outputs a risk score. A risk score is compared to a threshold value and an indication is provided regarding whether the risk score exceeds the threshold value. If a risk score is less than a threshold value, authentication is considered successful and a credential is generated for use by the client device 10. However, if the risk score exceeds the threshold value, authentication is considered unsuccessful and the adaptive authentication server 18 may perform a remedial activity. In at least some embodiments, the remedial activity may include sending an out of band challenge to the user (e.g., an SMS message to the user's smart phone) to give the user another chance to successfully authenticate.

Thus, in at least one embodiment of the current technique, if the user 10 is authenticated successfully based on a low risk score, the web application 22 creates a session based on the authentication token such as the SAML assertion provided by the user 10. Thus, the user 10 is redirected to a resource that has been requested by the user 10 because the user 10 is able to successfully create an authenticated session with web application 22 of the server 16.

Thus, in at least one embodiment of the current technique, a server uses an adaptive authentication system for evaluating identifying information such as device fingerprint of a user agent executing on a client device and behavioral risk information by using information gathered from the client device and from an authentication token created by an identity provider system.

It should be noted that authentication device 20, server 16, and adaptive authentication system 18 may all reside in a single server system. Further, it should be noted that an authentication token may be based on any one of the known communication protocols.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in validating association of client devices with authenticated clients, the method comprising:

receiving an authentication request from a client device used by a client for authenticating the client for establishing a session with a server;

authenticating the client, by an authentication device, wherein the client is authenticated by creating a first authentication token and providing the first authentication token to the client;

receiving a second authentication token from the client device for accessing the server;

gathering identification information of the client device, wherein the identification information identifies the client device;

evaluating the identification information gathered from the client device, wherein evaluating the identification information includes performing risk analysis by an adaptive authentication logic; and based on the evaluation, validating that the identification information of the client device providing the second authentication token to the server corresponds to a client device that has been associated with the authenticated client and the second authentication token is same as the first authentication token that has previously been created for the authenticated client during authentication of the client.

2. The method of claim 1, further comprising:

evaluating the token provided by a client device using statistical analysis based on the identification information of the client device.

3. The method of claim 1, further comprising:

associating a client device with an authenticated client.

4. The method of claim 1, wherein the token includes a Security Assertion Markup Language token.

5. The method of claim 1, wherein a user agent executes on the client device, wherein the user agent includes a web browser.

6. The method of claim 1, wherein the server includes a service provider system.

7. The method of claim 1, wherein the authentication device includes an identity provider system.

8. The method of claim 1, wherein identification information associated with a client device includes a device fingerprint of the client device.

9. The method of claim 1, wherein the identification information gathered from a client device is evaluated by an adaptive authentication system.

10. The method of claim 1, further comprising:

evaluating a risk score for determining whether a client device providing the token to the server is associated with a session of the authenticated client for which the token has been created; and based on the evaluation, validating that the client device is associated with the authenticated client.

11. A system for use in validating association of client devices with authenticated clients, the system comprising a client device and a server configured to:

receive an authentication request from the client device used by a client for authenticating a client for establishing a session with the server;

authenticate the client, by an authentication device, wherein the client is authenticated by creating a first authentication token and providing the first authentication token to the client;

receive a second authentication token from the client device for accessing the server;

gather identification information of the client device, wherein the identification information identifies the client device;

evaluate the identification information gathered from the client device, wherein evaluation of the identification information includes performing risk analysis by an adaptive authentication logic; and validate, based on the evaluation, that the identification information of the client device providing the second authentication token to the server corresponds to a client device that has been associated with the authenticated client and the second authentication token is same as the first authentication token that has previously been created for the authenticated client during authentication of the client.

12. The system of claim 11, further comprising:

evaluate the token provided by a client device using statistical analysis based on the identification information of the client device.

13. The system of claim 11, further comprising:

associate a client device with an authenticated client.

14. The system of claim 11, wherein the token includes a Security Assertion Markup Language token.

15. The system of claim 11, wherein a user agent executes on the client device, wherein the user agent includes a web browser.

16. The system of claim 11, wherein the server includes a service provider system.

17. The system of claim 11, wherein the authentication device includes an identity provider system.

18. The system of claim 11, wherein identification information associated with a client device includes a device fingerprint of the client device.

19. The system of claim 11, wherein the identification information gathered from a client device is evaluated by an adaptive authentication system.

20. The system of claim 11, further comprising:

evaluate a risk score for determining whether a client device providing the token to the server is associated with a session of the authenticated client for which the token has been created; and validate, based on the evaluation, that the client device is associated with the authenticated client.

* * * * *